United States Patent
Maruyama

(10) Patent No.: US 11,671,417 B2
(45) Date of Patent: Jun. 6, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yasuhiro Maruyama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 220 days.

(21) Appl. No.: 17/171,437

(22) Filed: Feb. 9, 2021

(65) Prior Publication Data
US 2022/0060458 A1 Feb. 24, 2022

(30) Foreign Application Priority Data

Aug. 18, 2020 (JP) .............................. JP2020-138062

(51) Int. Cl.
*H04L 9/40* (2022.01)
*G06Q 20/40* (2012.01)

(52) U.S. Cl.
CPC ............. *H04L 63/08* (2013.01); *G06Q 20/40* (2013.01)

(58) Field of Classification Search
CPC . H04L 63/08; H04L 63/0815; H04L 63/0807; H04L 63/10; H04L 67/025; H04L 63/083; H04L 63/0876; G06Q 20/40
See application file for complete search history.

(56) References Cited

U.S. PATENT DOCUMENTS

| 5,191,613 A * | 3/1993 | Graziano ............... H04L 9/3247 340/5.86 |
| 6,134,659 A * | 10/2000 | Sprong ................. G06F 21/121 380/255 |
| 8,549,639 B2 * | 10/2013 | Newman ............... G06F 21/554 713/188 |
| 9,240,990 B1 * | 1/2016 | Ruma ................... G06V 40/172 |
| 10,572,531 B1 * | 2/2020 | Tiwari .................. G06F 16/435 |
| 10,778,792 B1 * | 9/2020 | Handy Bosma ........ H04L 67/53 |
| 10,831,569 B1 * | 11/2020 | Thallapragada ........ G06F 9/542 |
| 10,983,850 B1 * | 4/2021 | Kwan ................. G06F 11/0793 |
| 11,379,921 B1 * | 7/2022 | Palka ..................... G06Q 40/08 |
| 11,496,479 B2 * | 11/2022 | Gupta ................... H04L 67/535 |

(Continued)

FOREIGN PATENT DOCUMENTS

| JP | 4780744 B2 | 9/2011 |
| JP | 6173112 B2 | 8/2017 |

*Primary Examiner* — Aravind K Moorthy
(74) *Attorney, Agent, or Firm* — Oliff PLC

(57) ABSTRACT

An information processing apparatus includes: a memory storing an agreement term log notified on each login and an agreement term on each service; and at least one processor, when in a, agreement terms notification, where, after a login on a first service, a second service different from the first service is logged in without a login operation of the user by using authentication information on the first service in order to transition from the first service to the second service, not notify an agreement term on the second service to the user if the agreement term on the second service is identical in the log to an agreement term notified on the first service, and notify the agreement term on the second service to the user if the agreement term on the second service is different in the log from the agreement term notified on the first service.

6 Claims, 8 Drawing Sheets

(56) References Cited

U.S. PATENT DOCUMENTS

| | | | |
|---|---|---|---|
| 2001/0003819 A1* | 6/2001 | Matsumoto | G06Q 10/10 715/272 |
| 2002/0194076 A1* | 12/2002 | Williams, Jr. | G06Q 30/0633 705/26.5 |
| 2003/0156719 A1* | 8/2003 | Cronce | G06F 21/105 380/256 |
| 2004/0019578 A1* | 1/2004 | Kalmes | G06F 16/90344 |
| 2004/0260942 A1* | 12/2004 | Jamieson | G06F 21/41 726/8 |
| 2005/0091143 A1* | 4/2005 | Schmidt | G06Q 30/08 705/37 |
| 2007/0021109 A1* | 1/2007 | Zellner | G06Q 30/02 455/418 |
| 2007/0076879 A1* | 4/2007 | Asokan | H04L 63/08 380/255 |
| 2007/0180061 A1* | 8/2007 | Bantz | H04L 41/5003 709/219 |
| 2008/0028319 A1* | 1/2008 | Cox | G06F 9/451 715/745 |
| 2009/0119763 A1* | 5/2009 | Park | H04L 63/0815 726/8 |
| 2009/0225763 A1* | 9/2009 | Forsberg | H04L 41/5003 370/400 |
| 2010/0011105 A1* | 1/2010 | Tatsubori | G06Q 30/0251 726/26 |
| 2010/0146037 A1* | 6/2010 | Little | H04L 41/508 709/203 |
| 2010/0223217 A1* | 9/2010 | Little | G06Q 10/10 709/224 |
| 2011/0131309 A1* | 6/2011 | Akiyama | H04L 12/14 709/223 |
| 2011/0154311 A1* | 6/2011 | Acker | G06F 8/71 717/168 |
| 2012/0030167 A1* | 2/2012 | Appiah | G06F 16/214 707/610 |
| 2012/0150685 A1* | 6/2012 | Hinojosa | G06F 21/6218 705/26.25 |
| 2012/0198241 A1* | 8/2012 | O'Hare | G06F 21/602 713/189 |
| 2012/0291114 A1* | 11/2012 | Poliashenko | G06F 21/44 726/8 |
| 2012/0297472 A1* | 11/2012 | Tamura | H04L 63/0815 726/8 |
| 2013/0204650 A1* | 8/2013 | Sabharwal | G06Q 30/016 705/7.13 |
| 2013/0227547 A1* | 8/2013 | Little | G06F 8/31 717/177 |
| 2014/0101225 A1* | 4/2014 | Abu-Libdeh | H04L 41/5096 709/203 |
| 2014/0122349 A1* | 5/2014 | Takatsu | G06Q 30/018 705/317 |
| 2014/0123292 A1* | 5/2014 | Schmidt | H04L 67/10 726/25 |
| 2015/0029871 A1* | 1/2015 | Frost | H04L 43/50 370/252 |
| 2015/0033315 A1* | 1/2015 | Gadamsetty | H04L 63/0807 717/124 |
| 2015/0046368 A1* | 2/2015 | Inoue | G06Q 10/10 705/342 |
| 2015/0067884 A1* | 3/2015 | Wang | G06F 21/105 726/27 |
| 2015/0215319 A1* | 7/2015 | Koeten | G06F 21/40 726/1 |
| 2015/0254450 A1* | 9/2015 | Ravi | H04L 63/126 726/8 |
| 2016/0026549 A1* | 1/2016 | Alshinnawi | G06F 1/26 714/14 |
| 2016/0125172 A1* | 5/2016 | Fuller | G06F 21/105 726/26 |
| 2017/0041793 A1* | 2/2017 | Lee | G06F 21/629 |
| 2017/0070483 A1* | 3/2017 | Sammet | G06F 21/123 |
| 2017/0154391 A1* | 6/2017 | Watkins | G06Q 50/18 |
| 2017/0192669 A1* | 7/2017 | Westergreen | G06F 3/0484 |
| 2017/0242596 A1* | 8/2017 | Liu | G06F 3/0613 |
| 2017/0262296 A1* | 9/2017 | Sohn | H04L 67/51 |
| 2017/0308687 A1* | 10/2017 | Marnell | G06F 21/6218 |
| 2017/0346810 A1* | 11/2017 | Mazzagatte | H04L 63/10 |
| 2018/0123911 A1* | 5/2018 | Zhang | H04L 43/08 |
| 2018/0167378 A1* | 6/2018 | Kostyukov | H04L 63/0815 |
| 2018/0316581 A1* | 11/2018 | Okwii | H04L 43/12 |
| 2018/0332122 A1* | 11/2018 | Shahid | H04L 67/141 |
| 2019/0129599 A1* | 5/2019 | Manthina | G06F 3/04817 |
| 2019/0297071 A1* | 9/2019 | Canavor | H04L 63/08 |
| 2019/0327232 A1* | 10/2019 | Koehler | H04L 63/0892 |
| 2019/0340271 A1* | 11/2019 | Faulhaber | G06F 16/2433 |
| 2019/0356650 A1* | 11/2019 | Leavy | H04L 63/06 |
| 2019/0386873 A1* | 12/2019 | Wakabayashi | H04L 41/5003 |
| 2020/0026916 A1* | 1/2020 | Wood | G06V 30/416 |
| 2020/0074468 A1* | 3/2020 | Arai | G06Q 20/405 |
| 2020/0097129 A1* | 3/2020 | Dykan | G06F 8/38 |
| 2020/0112884 A1* | 4/2020 | Kweon | H04L 45/306 |
| 2020/0196143 A1* | 6/2020 | Woo | H04W 12/04 |
| 2020/0226364 A1* | 7/2020 | Gehler | G06N 5/01 |
| 2020/0313979 A1* | 10/2020 | Kumaran | H04L 41/16 |
| 2020/0396058 A1* | 12/2020 | Yang | G06F 16/2379 |
| 2021/0012289 A1* | 1/2021 | Hsieh | H04L 65/403 |
| 2021/0099848 A1* | 4/2021 | Ruan | H04W 4/44 |
| 2021/0111869 A1* | 4/2021 | Boone | H04L 9/0643 |
| 2021/0158463 A1* | 5/2021 | Madl | G06Q 50/18 |
| 2021/0160897 A1* | 5/2021 | Young | H04W 72/1257 |
| 2021/0176320 A1* | 6/2021 | Cui | H04L 67/141 |
| 2021/0185046 A1* | 6/2021 | Gupta | G06F 3/0482 |
| 2021/0192073 A1* | 6/2021 | Goodsitt | G06F 21/6245 |
| 2021/0271649 A1* | 9/2021 | Narayanaswami | H04L 9/3239 |
| 2022/0014507 A1* | 1/2022 | Hawkins | G06F 3/0481 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-138062 filed Aug. 18, 2020.

BACKGROUND

(i) Technical Field

The present disclosure relates to an information processing apparatus and a non-transitory computer readable medium.

(ii) Related Art

Japanese Patent No. 4780744 discloses a host computer connected to a terminal apparatus via a network. The host computer includes a screen generation control unit and a session check unit. The screen generation control unit generates a screen used to control database search in response to a request of a browser in the terminal apparatus. The session check unit stores a log of screens and session data. The screens of the log are displayed by the browser and successively shifted during a period from a login to a logout of the browser. The session data includes a record of information related to transfer data that is used to relay, in an error free manner, data input on an immediately preceding display screen to a next screen. By referring to the session data, the session check unit checks the validity of a display screen requested by the browser and notifies the screen generation control unit of check results. In response to a request inconsistent with the flow of an operation and screen transition, the session check unit performs an error operation to deny the request by issuing an error message. The session check unit includes a privilege check unit. When the reception of a request to display a screen is received from the browser, the privilege check unit refers to a registered person database that has registered an authorized user and determines the privilege of the authorized user. The privilege check unit then notifies the screen generation control unit of determination results. The session data includes login time, information on a group to which a user belongs to, the privilege level of the user, and search condition. The session check unit includes a log recording unit. The log recording unit generates and stores log management data including information identifying the user extracted from the session data, information indicating connection time, information indicating Internet protocol (IP) address, and process contents.

Japanese Patent No. 6173112 discloses a system that determines whether to notify to a user an agreement term to be used to use a specific function. The system includes an acquisition unit and a determination unit. The acquisition unit acquires language information identifying a language corresponding to the user and agreement information related to a date on which the user has agreed with an agreement term. When a request to use the specific function is received from the user, the determination unit determines whether to notify to the user an agreement term from among multiple agreement terms corresponding to multiple languages, in accordance with the date of the agreement term on the language information acquired by the acquisition unit and the agreement term acquired by the acquisition unit.

When a user uses services, an agreement term may be notified to the user. The user may log in on a first service and then log in on a second service different from the first service using authentication information for the login on the first service. During the login time of the second service, a login screen is not displayed and the agreement term is not notified. If the agreement term is notified each time the user logs in on the second service, the agreement term notified in the login on the first service may be duplicated. The user may thus reconfirm the agreement term.

SUMMARY

Aspects of non-limiting embodiments of the present disclosure relate to providing an information processing apparatus and a non-transitory computer readable medium notifying an agreement term that is not duplicated with an agreement term in a first service even when in a notification of agreement terms to a user using services, the user logs in on the first service and then logs in on a second service different from the first service by using authentication information for the first service.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a memory storing a log of an agreement term notified on each login of a user and an agreement term on each service; and at least one processor configured to, when in a notification of the agreement terms to the user who is to use services, in a case where, after a login on a first service, a second service different from the first service is logged in without a login operation of the user by using authentication information on the first service in order to transition from the first service to the second service, not notify an agreement term on the second service to the user if the agreement term on the second service is identical in the log to an agreement term notified on the first service, and notify the agreement term on the second service to the user if the agreement term on the second service is different in the log from the agreement term notified on the first service.

BRIEF DESCRIPTION OF THE DRAWINGS

Exemplary embodiment of the present disclosure will be described in detail based on the following figures, wherein.

DETAILED DESCRIPTION

Exemplary embodiment of the present disclosure is described with reference to the drawings.

Figure 1:
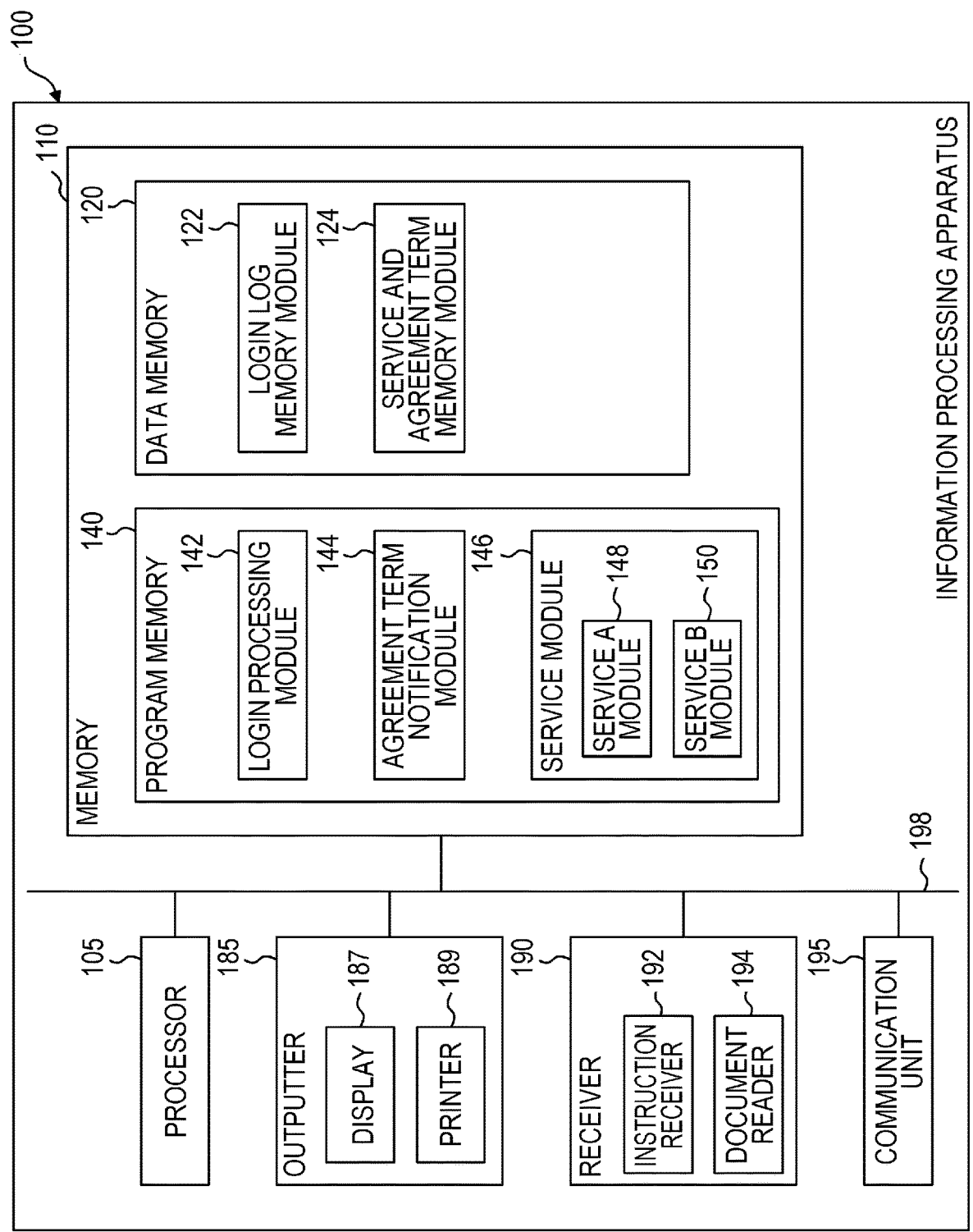
FIG. 1 illustrates a conceptual modular configuration of a structure of the exemplary embodiment.

FIG. 1 illustrates a conceptual modular configuration of a structure of the exemplary embodiment.

The term "module" refers to a software component (including a computer program) that is logically separable, or a hardware component. The module of the exemplary embodiment refers to not only a module in a computer program but also a module in a hardware configuration. The discussion of the exemplary embodiment also serves as the discussion of a system, method, and computer program that causes the modules to function (including a program that causes a computer to execute each step, a program that causes the computer to function as an element, and a program that causes the computer to implement each function). In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in a one-to-one correspondence. In software implementation, one module may be configured of one program or multiple modules may be configured of one program. One module may be configured of multiple programs. Multiple modules may be executed by a single computer. A single module may be executed by multiple computers in a distributed environment or a parallel environment. One module may include another module.

In the discussion that follows, the term "connection" refers to not only a physical connection but also a logic connection (such as an exchange of data, instructions, data reference relationship, or login).

The term "predetermined" means that something is decided in advance of a process of interest. The term predetermined is thus intended to refer to something that is decided in advance of a process of interest in the exemplary embodiment. Even after a process in the exemplary embodiment has started, the term predetermined refers to something that is decided in advance of a process of interest depending on a condition or a status of the exemplary embodiment at the present point of time or depending on a condition or status of the exemplary embodiment heretofore continuing down to the present point of time. If plural predetermined values are used, the predetermined values may be different from each other, or two or more of the predetermined values (including all the values) may be equal to each other.

A statement that "if A, B is to be performed" is intended to mean that a determination as to whether something is A is performed and that if something is determined as A, an action B is to be taken. The statement becomes meaningless if the determination as to whether something is A is not performed. If a discussion is made of events "A, B, and C," the discussion is applicable to at least one of the events "A, B, and C" unless otherwise noted. For example, the discussion is applicable to the case in which only the event A is selected.

The term "system" or the term "apparatus" refers to an arrangement where multiple computers, a hardware configuration, and an apparatus are interconnected via a communication network (including a one-to-one communication connection). The term system or the term apparatus also refers to an arrangement that includes a single computer, a hardware configuration, and an apparatus. The term system and the term apparatus have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate.

An information processing apparatus 100 of the exemplary embodiment has a function of notifying an agreement term to a user when the user uses a service. Referring to FIG. 1, the information processing apparatus 100 includes, at least, a processor 105, memory 110 and bus 198 that connects these elements to exchange data. The information processing apparatus 100 may further include an outputter 185, receiver 190, and communication unit 195. Data is also exchanged via the bus 198 from one to another element among the processor 105, memory 110, outputter 185, receiver 190, and communication unit 195.

The block diagram in FIG. 1 also indicates a hardware configuration of a computer that implements the exemplary embodiment. The hardware configuration of the computer that executes a program of the exemplary embodiment is a computer illustrated in FIG. 1. Specifically, the hardware configuration is a personal computer or a computer that may be used as a server. Specifically, the processor 105 and memory 110 are used as a processing unit and a storage device, respectively.

One or more processors 105 may be used. The processor 105 may include a central processing unit (CPU) or a microprocessor. If multiple processors 105 are used, they are tightly coupled or loosely coupled. For example, a single processor 105 may include multiple processor cores. Multiple computers are coupled as a system that virtually functions as a single computer. Specifically, a loosely coupled multi-processor may be configured as a cluster system or a computer cluster. The processor 105 executes a program on a program memory 140.

The memory 110 may include a semiconductor memory, such as a register or a cache memory, in the processor 105 or a memory, such as a random-access memory (RAM) or a read-only memory (ROM). The memory 110 may also be an internal memory device, such a hard disk drive (HDD) or a solid-state drive (SSD), each functioning as a persistent memory, or an external memory device or an auxiliary memory device, such as a compact disc (CD), or digital versatile disc (DVD), Blu-ray (registered trademark) disc, universal serial bus (USB) memory, memory card or other external storage device or other auxiliary memory device. The memory 110 may also be a memory device of a server connected to the information processing apparatus 100 via a communication network.

The memory 110 includes a data memory 120 storing data and a program memory 140 storing programs. The data memory 120 and the program memory 140 may store information and programs of the modules illustrated in FIG. 1, programs such as an operating system (OS) to start up the computer, and data, such as parameters that appropriately vary in the execution of the modules.

The outputter 185 includes a display 187 and printer 189. The display 187 may be a liquid-crystal display, organic electroluminescent (EL) display, or three-dimensional display and displays, in text or image, process results from the processor 105 and data on the data memory 120. The printer 189 may be a printer or a multi-function device and prints the process results from the processor 105 and data on the data memory 120. The outputter 185 may also include a speaker and actuator to vibrate the outputter 185.

The receiver 190 includes an instruction receiver 192 and a document reader 194. The instruction receiver 192 includes a keyboard, mouse, microphone, camera (including eye-gaze detection camera) or other device and receives data generated in response to user operation performed on these device (such as an action, voice, gaze of a user).

A touch screen having the functions of both the display 187 and the instruction receiver 192 may be used. In such a case, without the physical presence of keys, the keyboard function may be implemented by drawing a keyboard (called a software keyboard or a screen keyboard) on the touch screen using software.

A display 187 and instruction receiver 192 are used as user interfaces.

The document reader 194, such as a scanner or camera, reads or photographs a document to create image data.

The communication device 195 is a communication network interface used to connect to another apparatus via a communication network.

The exemplary embodiment related to a computer program is implemented when the computer program as software is read onto the program memory 140 as a hardware resource and the software and hardware cooperate with each other. Specifically, to implement the exemplary embodiment, information processing based on software is performed by hardware resources (at least including the processor 105 and the memory 110 and in some cases further the outputter 185, receiver 190, and communication unit 195). The exemplary embodiment is thus implemented in accordance with the laws of nature.

The hardware configuration in FIG. 1 is illustrated for exemplary purposes only. The exemplary embodiment is not limited to the configuration illustrated in FIG. 1 and is acceptable as long as the configuration implements the modules of the exemplary embodiment. For example, the processor 105 may include a graphics processing unit (GPU) (including general-purpose computing on graphics processing unit (GPGPU)). Part of the modules may be implemented by a dedicated hardware resource (such as application specific integrated circuit (ASIC)) or field-programmable gate array (FPGA) that is a reconfigurable integrated circuit. Part of the modules may be in an external system that is connected via a communication network. Multiple of the system in FIG. 1 may be operatively coupled via a communication network. The system in FIG. 1 may be incorporated in a personal computer, portable information communication apparatus (such as cellular phone, smart phone, mobile device, or wearable computer), information appliance, robot, copier, fax, scanner, printer, or multi-function apparatus (an image processing apparatus having at least two of scanner function, printer function, copier function, and fax function).

The processor 105 is connected to the memory 110, outputter 185, receiver 190, and communication device 195 via the bus 198. The processor 105 executes a process in accordance with the computer program that describes an execution sequence of each module and is stored on the program memory 140. For example, in response to an event when the instruction receiver 192 receives user operation, the processor 105 performs the process of a module responsive to the event on the program memory 140, causes the data memory 120 to store the process results, outputs the process results to the display 187, or transmits the process results to another apparatus by controlling the communication device 195.

The memory 110 includes the data memory 120 and program memory 140 and is connected to the processor 105, outputter 185, receiver 190, and communication device 195 via the bus 198.

The data memory 120 includes a login log memory module 122 and service and agreement term memory module 124.

The login log memory module 122 stores a log of an agreement term notified on each login of a user. The log stored on the login log memory module 122 may be information that identifies an agreement term notified to the user in the past. The agreement term notified to the user in the past is an agreement term notified on a service used prior to a service the user is presently using. For example, the agreement term notified to the user may be an agreement term notified in an immediately preceding login. For example, a service A and service B may now cooperate with each other. When the user may transition from the service A to the service B, the agreement term notified to the user corresponds to an agreement term notified on the service A. The service A corresponds to a "first service" and the service B corresponds to a "second service." For example, services A, B, and C may now cooperate with each other. In that case, when the user transitions to the service C, the agreement term notified to the user corresponds to an agreement term notified on the service A, an agreement term notified on the service B, or an agreement term notified on the services A and B. When the user transitions to the service C, the user has explicitly logged in on the service A. In the transition to the service B, the login operation has been performed without the user login operation. The login operation is thus performed on both the service A and the service B. In that case, the service A or the service B corresponds to the first service and the service C corresponds to the second service.

Figure 5:
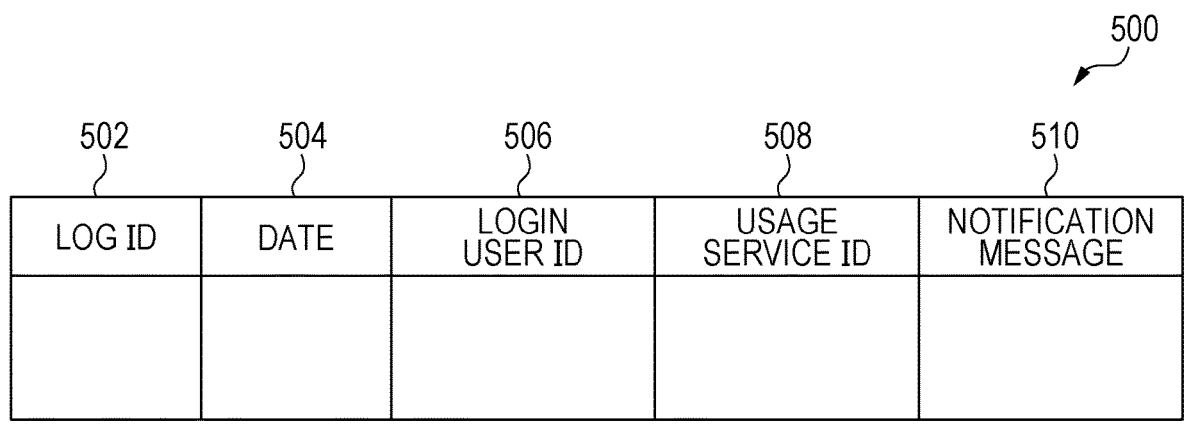
FIG. 5 illustrates a data structure of a log table.

The login log memory module 122 stores a log table 500 in FIG. 5.

FIG. 5 illustrates a data structure of the log table 500.

The log table 500 includes a log ID column 502, date column 504, login user ID column 506, usage service ID column 508, and notification message column 510. The log table 500 stores the log of notified agreement terms. The log ID column 502 stores information uniquely identifying a log in the exemplary embodiment (specifically, a log identification (ID)). The date column 504 stores information uniquely identifying a login user in the exemplary embodiment (specifically, login user ID). The login user ID column 506 stores information uniquely identifying a user who has logged in in the exemplary embodiment (specifically, a login user ID). The usage service ID column 508 stores information uniquely identifying a service used by the user in the exemplary embodiment (specifically, a usage service ID). The notification message column 510 stores a message as an agreement term notified to use the service. The notification message column 510 stores a message itself or information uniquely identifying the message in the exemplary embodiment.

The service and agreement term memory module 124 stores the agreement term for each service. The information stored on the service and agreement term memory module 124 may be an agreement term defined on a per service basis. In accordance with the information stored on the service and agreement term memory module 124, an agreement term notification module 144 notifies to the user the agreement term on a service on which the user is logging in.

Figure 4:
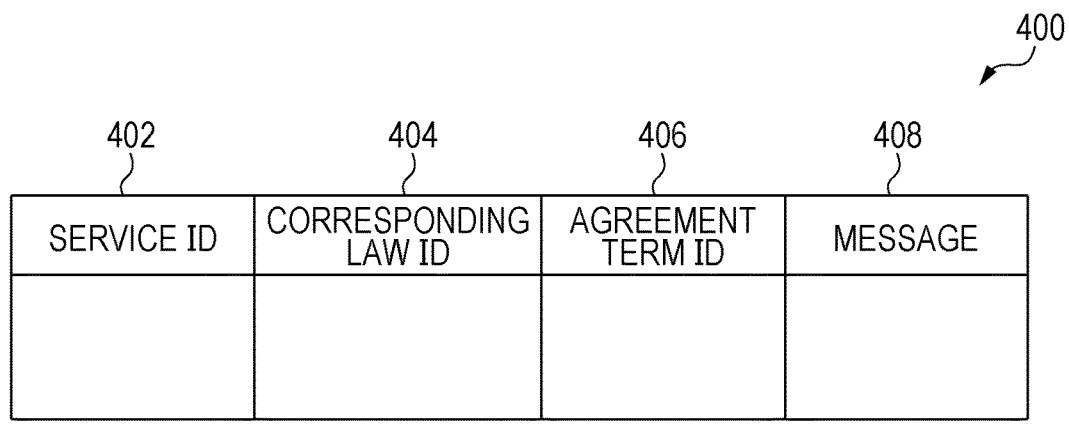
FIG. 4 illustrates a data structure of a service to agreement term association table.

The service and agreement term memory module 124 stores, for example, a service to agreement term association table 400 in FIG. 4.

FIG. 4 illustrates a data structure of the service to agreement term association table 400.

The service to agreement term association table 400 includes a service ID column 402, corresponding law column 404, agreement term ID column 406, and message column 408. According to the exemplary embodiment, the service ID column 402 stores information uniquely identifying a service (specifically, a service ID). According to the exemplary embodiment, the corresponding law column 404 stores information uniquely identifying a law corresponding to the service (specifically, a corresponding law ID). The agreement term ID column 406 stores information uniquely identifying an agreement term on the corresponding law in the exemplary embodiment (specifically, an agreement term ID). The message column 408 stores a message that specifically describes the agreement term.

The program memory 140 stores a login processing module 142, agreement term notification module 144, and service module 146.

The login processing module 142 performs a login operation to a service the user is going to use.

The login processing module 142 logs in on the first service. The login processing module 142 logs in on the second service different from the first service without the user login operation by using authentication information for the login on the first service.

The second service is different from the first service.

The user is to perform the login operation to use the first service and is to perform the login operation to use the second service.

However, if the first and second services cooperate with each other and the login has been performed on the first service, the second service may also be used. Specifically, the user is to perform the login operation on the first service but is free to transition to the second operation (specifically, the user is authorized to use the second operation) without performing the login operation on the second operation. This operation is hereinafter referred to as a cooperative login operation. For example, a technique called single sign on (SSO) may be used.

When the user uses a service, the agreement term notification module 144 notifies the agreement term on the service to the user.

The notification refers to an operation to notify information to the user and may be performed by displaying the information on screen or by using sound or by using a combination thereof.

When in a notification of the agreement terms to the user who is to use services, after a login on the first service, the second service different from the first service is logged in without the login operation of the user by using authentication information on the first service in order to transition from the first service to the second service, the agreement term notification module 144 does not notify an agreement term on the second service to the user if the agreement term on the second service is identical in the log on the login log memory module 122 to an agreement term notified on the first service and the agreement term notification module 144 notifies the agreement term on the second service to the user if the agreement term on the second service is different in the log from the agreement term notified on the first service.

The case in which the agreement term on the second service is different from the agreement term notified on the first service means that any of the original agreement terms on the second service is not included in the agreement terms notified on the first service. This also means that the number of agreement terms on the first service is insufficient for the second service. The case described above may include the following examples: (1) if an agreement term to be notified on the second service is not present among the agreement terms notified on the first service, (2) an agreement term to be notified on the second service is present among the agreement terms notified on the first service but is not enough in terms of detail (for example, an agreement term A notified on the first service is substantially identical to an agreement term B to be notified on the second service but the agreement term A is broader in concept than the agreement term B and the agreement term B is more detailed than the agreement term A), (3) items of an agreement term to be notified on the second service are present among items of the agreement term notified on the first service but there is a difference between contents to be notified between the first service and the second service (for example, the agreement term A notified on the first service and the agreement term B to be notified on the second service are identical in view of an item for a time period throughout which user information is to be stored in service but different in view of a value in the item. For example, the agreement term A has a time period of 30 days while the agreement term B has a time period of 180 days).

Control is performed such that the agreement term is not notified if the agreement term notified on the first service is identical to the agreement term on the second service and such that the different agreement term is notified if the agreement term notified on the first service is different from the agreement term on the second service. The agreement terms of the second service may thus appropriately notified.

When a session using the first service or the second service ends, the agreement term notification module 144 may delete the log on the login log memory module 122.

The notification of the agreement term may be managed on a per session basis.

Specifically, if the log is simply used, an agreement term may not be notified as being an agreement term previously notified in the log even after the end of the session. The use of the log on a per session basis controls this.

If a predetermined time period has elapsed between a notification of the agreement term on the first service and a transition to the second service, the agreement term notification module 144 may notify the agreement even though the agreement term notified on the first service is identical to the agreement term on the second service. If the predetermined time period has elapsed, the agreement term notified on the first service is notified again to call attention. A determination criteria as to whether a predetermined time period has elapsed between the notification of the agreement term on the first service and the transition to the second service may be based on a timing when the transition to the second service is detected after the time elapse of the predetermined time period that has started since the notification of the agreement term on the first service.

When the agreement term notified on the first service is notified, the agreement term notification module 144 may notify the agreement term in a different notification form.

The different notification form may simply indicate that the agreement term has been notified (in other words, indicate that the notification of the agreement term in the different notification form is used for the first time). For example, the different agreement term may be displayed in a size smaller than the size of the agreement term on the first service, lighter in brightness than the agreement term on the first service, or later in notification order than the agreement term on the first service.

When in a notification of the agreement terms to the user who is to use services, after a login on the first service, the second service different from the first service is enabled to be logged in without a login operation of the user by using authentication information on the first service in order to transition from the first service to the second service, the first service may be logged out. In other words, although a cooperative login operation is available, the first service is logged out and the user login operation is performed to transition to the second service.

The first service may be automatically logged out or the user may be requested to decide whether to grant the logout of the first service. In the latter case, the user may be requested to not only decide whether to grant the logout but also confirm the necessity of the login operation to transition to the second service.

When the first service is logged out, the session ends. In such a case, the log on the login log memory module 122 is not deleted and this is different from the case described previously.

To log in on the second service, the agreement term notification module 144 uses the log on the login log memory module 122. If the agreement term on the second embodiment is identical to the agreement term notified on the first service, the agreement term notification module 144 performs control to not notify the agreement term. If the agreement term on the second embodiment is different from the agreement term notified on the first service, the agreement term notification module 144 performs control to notify the different agreement term.

The service module 146 stores a service A module 148, and service B module 150.

A service performed by the service A module 148 or the service B module 150 involves in the notification to notify the agreement term to the user to use the service. The notification of the agreement term is required by laws and regulations. More detail is described below.

Figure 2A:
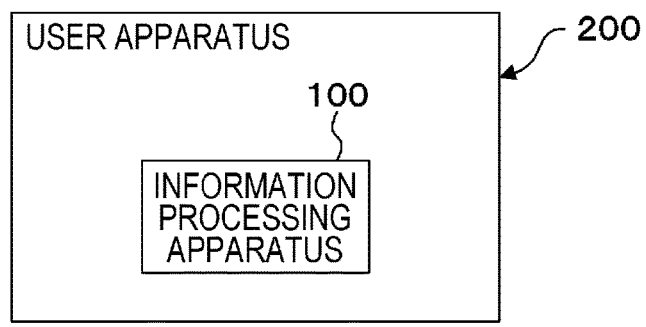
FIGS. 2A and 2B illustrate system configurations of the exemplary embodiment.
Figure 2B:
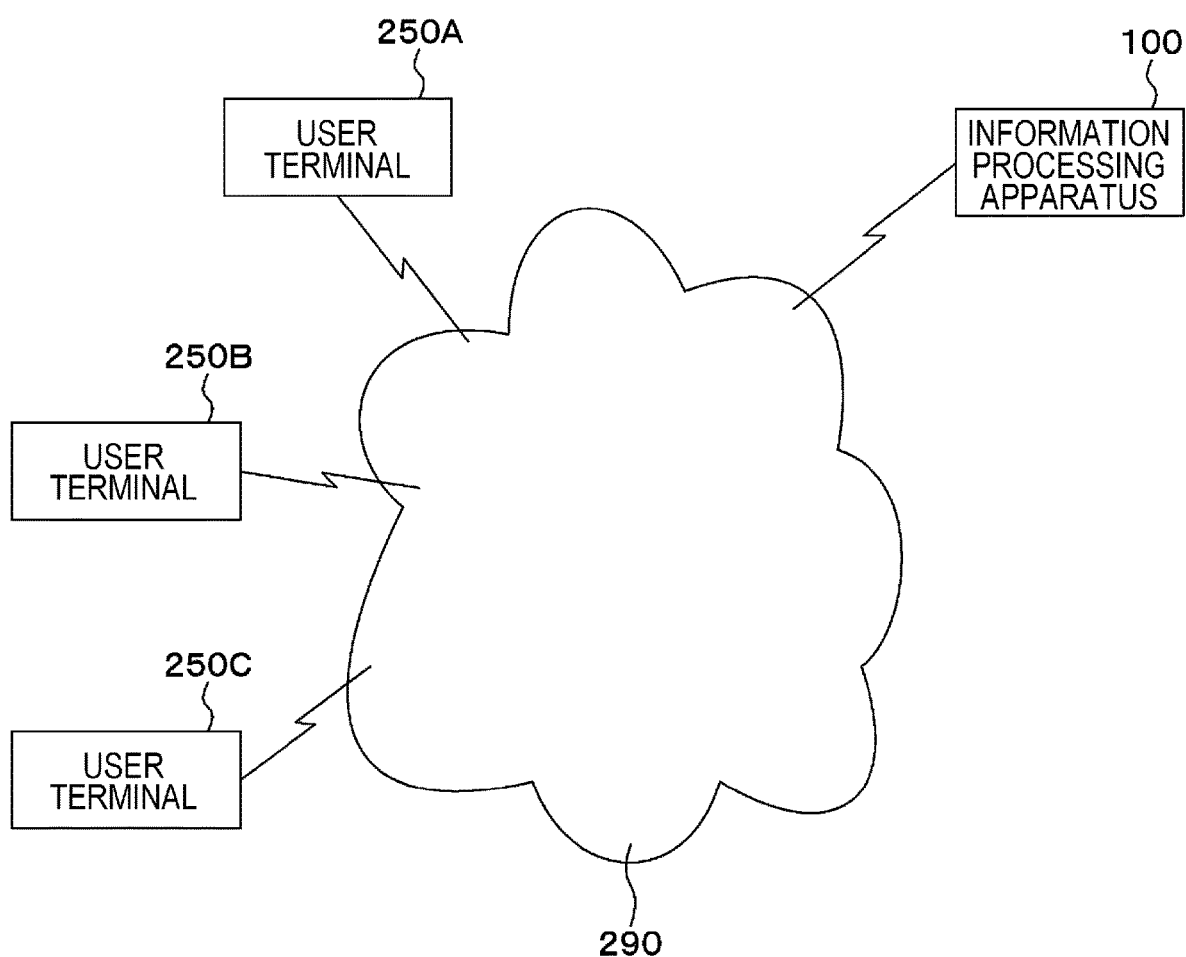

FIGS. 2A and 2B illustrate a system configuration of the exemplary embodiment.

To comply with part of the laws and regulations, a specific message is to be displayed on a login screen to the user. The laws and regulations include laws and regulations of each country and may further include standards and specifications.

The laws and regulations related to the notification of the agreement term to the user may include NIST SP800-53 (Security and Privacy Control for all U.S. Federal Information Systems) and NIST SP800-171 (Protecting Controlled Unclassified Information in Nonfederal Systems and Organizations) formulated by the National Institute of Standards and Technology (NIST).

SP800-53 AC-8 System Use Notification requires the following operations.

The information system:
a. Displays to users [Assignment: organization-defined system use notification message or banner] before granting access to the system that provides privacy and security notices consistent with applicable federal laws, Executive Orders, directives, policies, regulations, standards, and guidance and states that:
1. Users are accessing a U.S. Government information system;
2. Information system usage may be monitored, recorded, and subject to audit;
3. Unauthorized use of the information system is prohibited and subject to criminal and civil penalties; and
4. Use of the information system indicates consent to monitoring and recording;
b. Retains the notification message or banner on the screen until users acknowledge the usage conditions and take explicit actions to log on to or further access the information system; and
c. For publicly accessible systems:
1. Displays system use information [Assignment: organization-defined conditions], before granting further access;
2. Displays references, if any, to monitoring, recording, or auditing that are consistent with privacy accommodations for such systems that generally prohibit those activities; and
3. Includes a description of the authorized uses of the system.

According to the exemplary embodiment, if a cooperative login operation is available in using multiple services, an agreement term is to be notified to the user before each service is used.

If agreement terms corresponding to all the laws and regulations may be displayed on a login screen of the service that is used first, an agreement term on a service that is not used in the end is also displayed. This leads to an excessive workload on the user. When the first service is transitioned to the second service in the cooperative login operation, an explicit login operation by the user is not performed and the login screen itself is not present. For this reason, the timing of notifying the agreement term on the second service is not certain.

When the first service is transitioned to the second service in the exemplary embodiment, the agreement term on the second service is notified. The contents of the agreement term to be notified are not duplicated in the agreement term notified on the first service and any agreement term that is not specified in the agreement terms notified on the first service lacks is notified.

FIG. 2A illustrates a system configuration of a standalone-type user apparatus 200 of the exemplary embodiment. The user apparatus 200 is used by a user and may be a person computer (including notebook computer) or a mobile terminal.

The user apparatus 200 includes the information processing apparatus 100. The user uses a service of the information processing apparatus 100 by operating the user apparatus 200. When the service is used, the agreement term corresponding to the service is notified on the display or speaker of the user apparatus 200.

FIG. 2B illustrates a system configuration of a network system of the exemplary embodiment. The information processing apparatus 100 and user terminals 250A through 250C are interconnected to each other via a communication network 290. The communication network 290 may be a wireless network, a wired network, or a combination thereof. For example, the communication network 290 may be the Internet or intranet as a communication infrastructure. The function of the information processing apparatus 100 may be implemented as a cloud service.

The user uses a service on the information processing apparatus 100 via the communication network 290 by operating a browser or the like on a user terminal 250. When the service is used, the agreement term on the service is notified via the display or speaker on the user terminal 250.

The notification of the agreement term is specifically described.

A log of notifications of agreement terms is stored on a per session basis. In transition from another service, the log is referenced. If an additional notification of an agreement term is to be performed, that notification is performed. If an additional notification of an agreement term is not to be performed, the notification is not performed.

The laws and regulations may be associated with services as follows:
Service A: Regulation 1
Service B: Regulations 1 and 2
Service c: Regulation 2
Service D: (not applicable regulation)
Transitions may be performed from service to service as follows:
(1) If the service A is transitioned to the service B, the agreement term of the regulation 2 is additionally notified.
(2) If the service A is transitioned to the service C, the agreement term of the regulation 2 is additionally notified.
(3) If the service B is transitioned to the service A, no agreement term is additionally notified.
(4) If the service B is transitioned to the service C, no agreement term is additionally notified.
(5) If the service D is transitioned to the service B, the agreement terms of the regulations 1 and 2 are notified.

In three or more service transitions, the notification is performed in a similar fashion. Specifically, an agreement term previously notified is not notified and a still unnotified agreement term is notified. For example, if the service C is transitioned to the service D after the transition from the service A to the service C, no additional notification is made. If the service D is transitioned to the service C after the transition from the service A to the service D, the agreement term of the regulation 2 is additionally notified.

Figure 3:
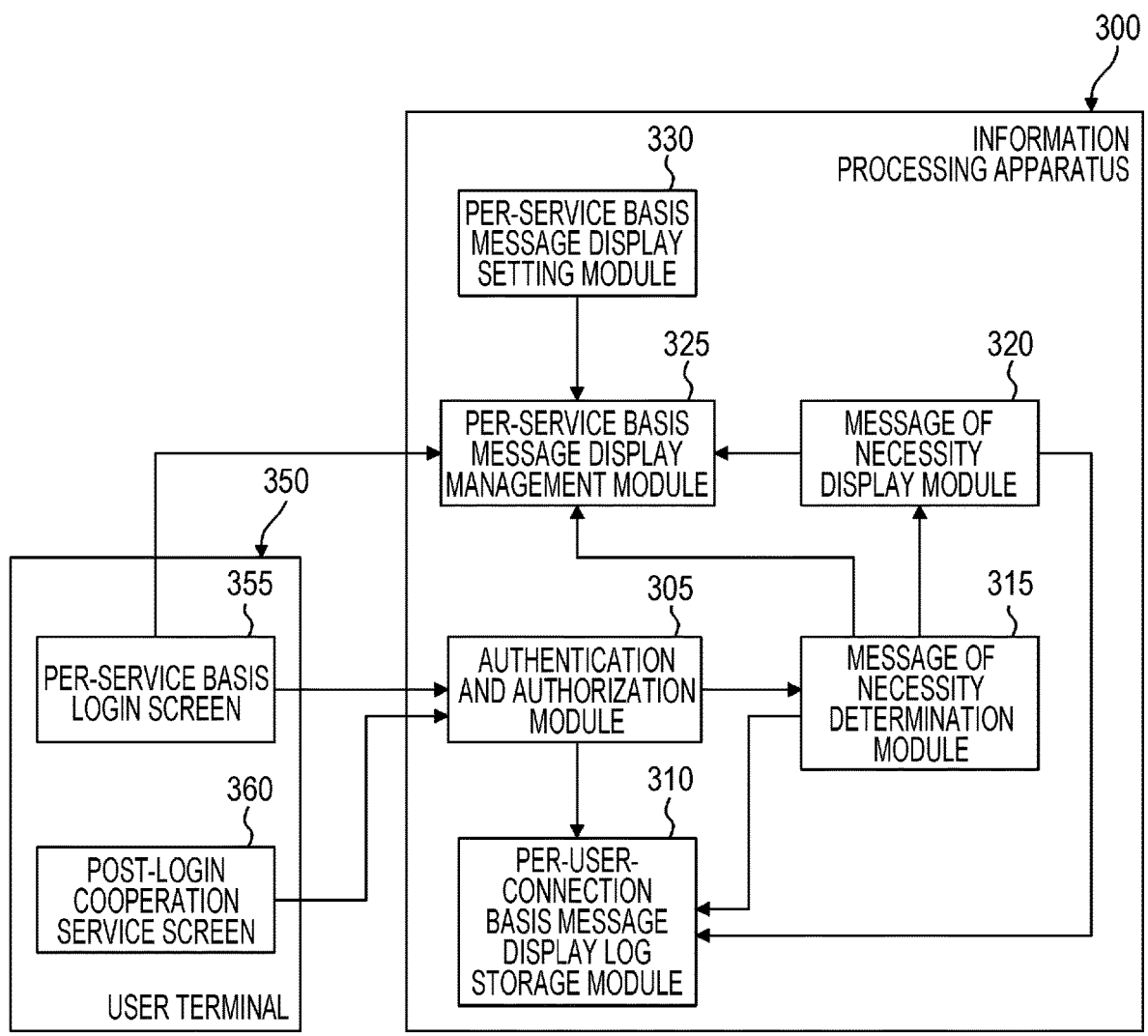
FIG. 3 illustrates a specific modular configuration of an structure of the exemplary embodiment.

FIG. 3 illustrates a specific modular configuration of an structure of the exemplary embodiment. The notification is made by using a display.

An information processing apparatus 300 includes an authentication and authorization module 305, per-user-connection basis message display log storage module 310, message of necessity determination module 315, message of necessity display module 320, per-service basis message display management module 325, and per-service basis massage display setting module 330.

The authentication and authorization module 305 is connected to the per-user-connection basis message display log storage module 310, message of necessity determination module 315, and a per-service basis login screen 355 and post-login cooperation service screen 360 in a user terminal 350. The authentication and authorization module 305 processes a request for authentication or a request for authorization. For example, the authentication and authorization module 305 performs OAuth process. To prepare for a transition to another service, the authentication and authorization module 305 calls the per-user-connection basis message display log storage module 310 and stores a display log of a legal compliance message. To prepare for a transition from another service, the authentication and authorization module 305 calls the message of necessity determination module 315 and displays a legal compliance message as appropriate.

The per-user-connection basis message display log storage module 310 is connected to the authentication and authorization module 305, message of necessity determination module 315, and message of necessity display module 320. The per-user-connection basis message display log storage module 310 stores a display log of the legal compliance message notified on a per service basis. For example, the per-user-connection basis message display log storage module 310 stores the display log on a per session basis.

The message of necessity determination module 315 is connected to the authentication and authorization module 305, per-user-connection basis message display log storage module 310, message of necessity display module 320, and per-service basis message display management module 325. The message of necessity determination module 315 determines whether a message of necessity for a service (on the per-service basis message display management module 325) is displayed within the session (on the per-user-connection basis message display log storage module 310). If there is no display log for a message of necessity, the message of necessity determination module 315 causes the message of the necessity to be displayed (on the message of necessity display module 320).

The message of necessity display module 320 is connected to the per-user-connection basis message display log storage module 310, message of necessity determination module 315, and per-service basis message display management module 325. The message of necessity display module 320 acquires the message of necessity from the per-service basis message display management module 325 and displays the message of necessity on the screen of the per-user-connection basis message display log storage module 310. The message of necessity display module 320 stores the displayed log on the per-user-connection basis message display log storage module 310.

The per-service basis message display management module 325 is connected to the message of necessity determination module 315, message of necessity display module 320, per-service basis massage display setting module 330, and per-service basis login screen 355 in the user terminal 350. The per-service basis message display management module 325 stores a legal compliance message of necessity for each service.

The per-service basis massage display setting module 330 is connected to the per-service basis message display management module 325. The per-service basis massage display setting module 330 has a function of allowing the administrator of service to register or edit the legal compliance message. For example, the per-service basis massage display setting module 330 implements a setting screen via a web app or native app or software development kit (SDK) along a command line. The per-service basis massage display setting module 330 is used by a service provider. The per-service basis massage display setting module 330 may be set to not allow a customer or end user to use it. A service free from setting is free from displaying the legal compliance message and, in other words, is an ordinary service.

The user terminal 350 includes the per-service basis login screen 355 and post-login cooperation service screen 360. The user terminal 350 corresponds to the user terminal 250 in FIG. 2.

The per-service basis login screen 355 is connected to the authentication and authorization module 305 and per-service basis message display management module 325 in the information processing apparatus 300. The per-service basis login screen 355 is a login screen that is prepared on a per service basis and provides a cooperate login operation on multiple services. The per-service basis login screen 355 transfers a request for authentication or a request for authorization to the authentication and authorization module 305 in the information processing apparatus 300. The per-service basis login screen 355 receives the legal compliance message for the service of necessity from the per-service basis message display management module 325 in the information processing apparatus 300 and displays the legal compliance message on the screen of the user terminal 350.

The post-login cooperation service screen 360 is connected to the authentication and authorization module 305 in the information processing apparatus 300. The post-login cooperation service screen 360 is a screen used in a service subsequent to the login. When a variety of operations is performed, the post-login cooperation service screen 360 transmits to the authentication and authorization module 305 a request for authentication or a request for authorization to confirm the user privilege.

Figure 6:
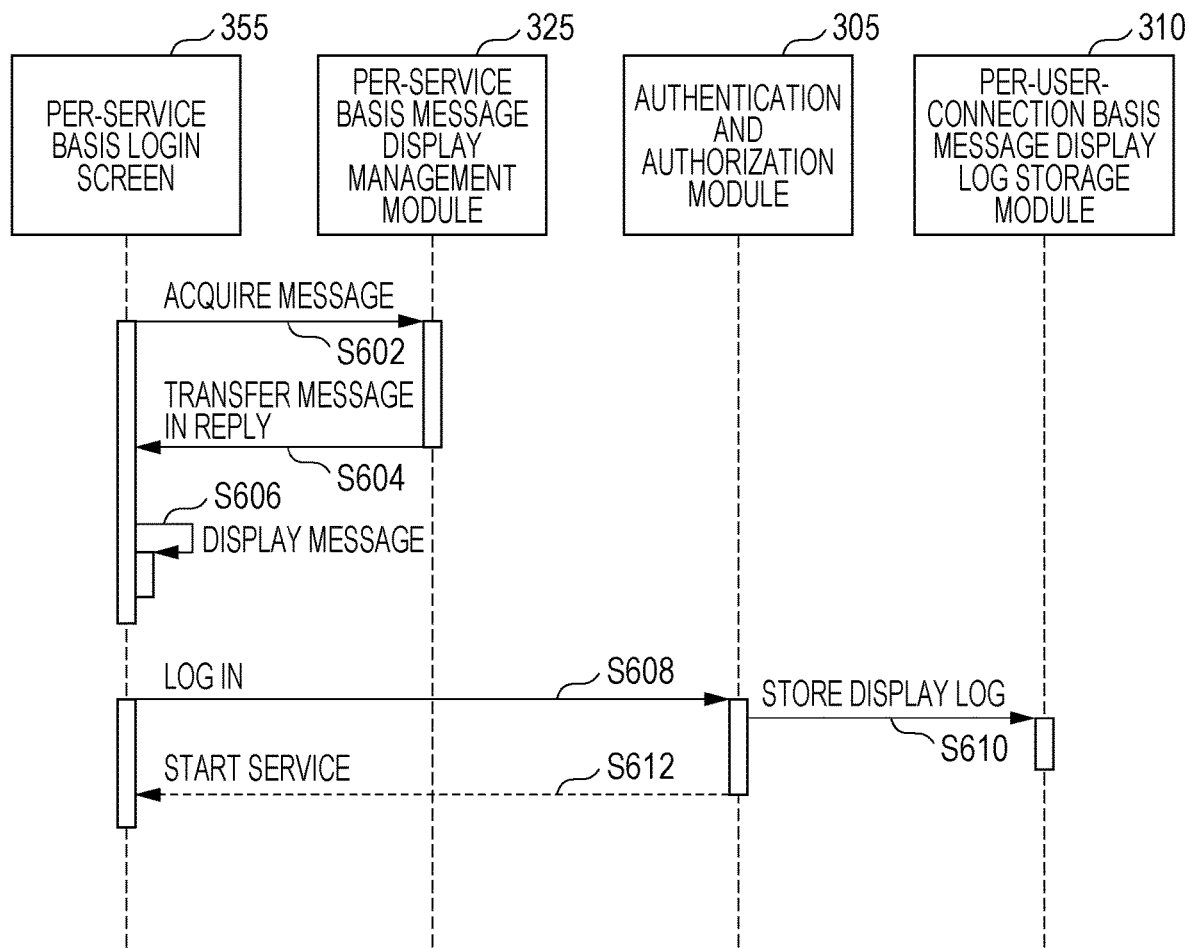
FIG. 6 is a flowchart illustrating a process example of the exemplary embodiment.

FIG. 6 is a flowchart illustrating a process example of the exemplary embodiment. The process indicates a login operation in a first service. The process is performed by the per-service basis login screen 355, per-service basis message display management module 325, authentication and authorization module 305, and per-user-connection basis message display log storage module 310. The process is the login operation on the first service performed by the user.

In step S602, in response to an operation of the user on the per-service basis login screen 355, the user terminal 350 transmits to the per-service basis message display management module 325 a command to acquire a message to be notified and a service identification (ID) of a service on which the user is logging in.

In step S604, the per-service basis message display management module 325 transmits in reply to the user terminal 350 a message corresponding to the service on which the user is logging in. Specifically, a message serving as an agreement term on the service having the service ID is extracted from the service to agreement term association table 400 and then transmitted in reply to the user terminal 350.

In step S606, the user terminal 350 displays the message received in step S604 on the per-service basis login screen 355.

In step S608, a login operation is performed on the authentication and authorization module 305 in response to user operation by using information input on the per-service basis login screen 355. The information input on the per-service basis login screen 355 may be a login ID and password. The information to be input on the per-service basis login screen 355 may also be obtained by reading biological information, such as fingerprint or face image.

In step S610, the authentication and authorization module 305 stores a display log on the per-user-connection basis message display log storage module 310. Specifically, the message serving as the agreement term transferred in reply in step S604 is stored on the log table 500.

In step S612, the authentication and authorization module 305 notifies the per-service basis login screen 355 that the service is enabled to start.

Figure 7:
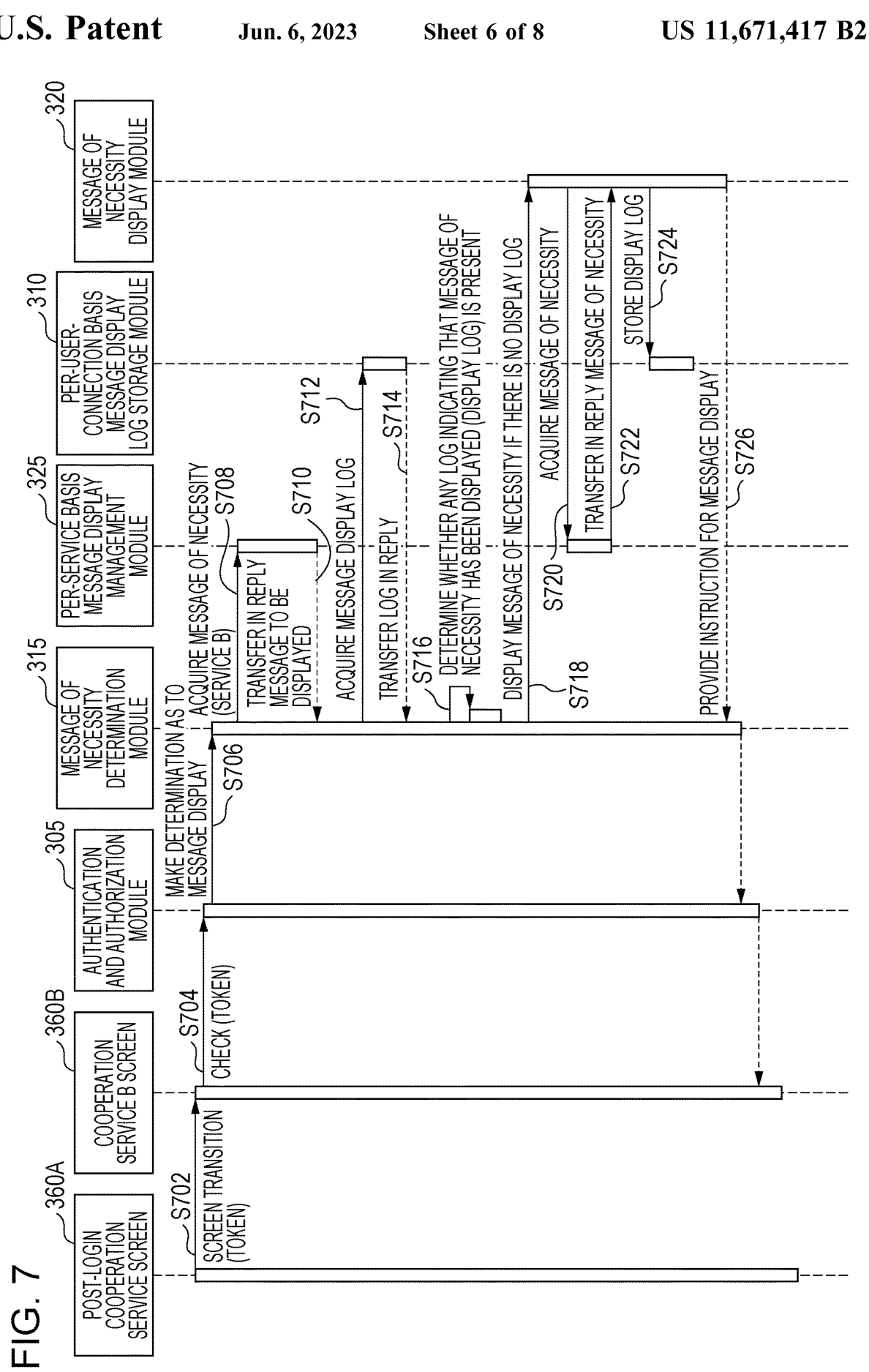
FIG. 7 is a flowchart illustrating a process example of the exemplary embodiment.

FIG. 7 is a flowchart illustrating a process example of the exemplary embodiment. The process is a display procedure to display the legal compliance message when a transition is performed from the logged service to another service. The process is performed by a post-login cooperative service A screen 360A, cooperative service B screen 360B, authentication and authorization module 305, message of necessity determination module 315, per-service basis message display management module 325, per-user-connection basis message display log storage module 310, and message of necessity display module 320. The process is an process example that displays a message serving an agreement term that is to be displayed on the second service when a transition is performed from the first service to the second service in a cooperative login operation.

In step S702, a screen transition is performed by using a token from the post-login cooperative service A screen 360A to the cooperative service B screen 360B. Specifically, the service A is transitioned to the service B in response to user operation.

In step S704, by using the cooperative service B screen 360B, the information processing apparatus 300 requests the authentication and authorization module 305 to check the token.

In step S706, the authentication and authorization module 305 requests the message of necessity determination module 315 to perform determination as to message displaying.

In step S708, the message of necessity determination module 315 transfers to the per-service basis message display management module 325 a command to acquire a message of necessity on the service B.

In step S710, the per-service basis message display management module 325 transfers in reply to the message of necessity determination module 315 a message to be displayed. Specifically, the per-service basis message display management module 325 extracts the message to be notified on the service B in accordance with the service to agreement term association table 400.

In step S712, the message of necessity determination module 315 transfers to the per-user-connection basis message display log storage module 310 a command to acquire a message display log.

In step S714, the per-user-connection basis message display log storage module 310 transfers in reply the log to the message of necessity determination module 315. Specifically, the per-user-connection basis message display log storage module 310 transfers in reply the message displayed in the same session in the past by using the log table 500.

In step S716, the message of necessity determination module 315 determines whether the log indicating that the message of necessity has been displayed is present. Specifically, the message of necessity determination module 315 determines whether the message received in step S710 is found in the message received in step S714. If the message is a previously notified message, that message is still a target of notification as long as a time period X serving as a threshold has elapsed since the date of the notification. In this way, the message of necessity determination module 315 may determine that the message received in step S710 is not found in the message received in step S714. The message displayed on the service A is a target of notification if the time period X has elapsed since the date of the notification. The message displayed on the service A is displayed in a display form different from the display form of a message that is newly displayed on the service B. For example, the message to be newly displayed on the service B may be larger in size and the message displayed on the service A may be smaller in size.

In step S718, the message of necessity determination module 315 transfers to the message of necessity display module 320 a command to display the message of necessity if there is no display log. No display log means that the message received in step S710 is not found in the message received in step S714. If the message received in step S710 is found in the message received in step S714, operations in step S718 thereafter are not performed. The message to be displayed on the service B has been already displayed on the service A.

In step S720, the message of necessity display module 320 transfers to the per-service basis message display management module 325 a command to acquire the message of necessity.

In step S722, the per-service basis message display management module 325 transfers in reply the message of necessity to the message of necessity display module 320.

In step S724, the message of necessity display module 320 stores the display log on the per-user-connection basis message display log storage module 310. Specifically, the message of necessity display module 320 adds the message to be displayed in step S726 to the log table 500 and stores the resulting log table 500 on the per-user-connection basis message display log storage module 310.

In step S726, the message of necessity display module 320 instructs the message of necessity determination module 315 to display the message. If there is no message of necessity in step S726, the instruction to display the message is not performed.

If a logout operation is performed on the service A or the service B, the session ends and data on the login log memory module 122 in that session is deleted.

Figure 8:
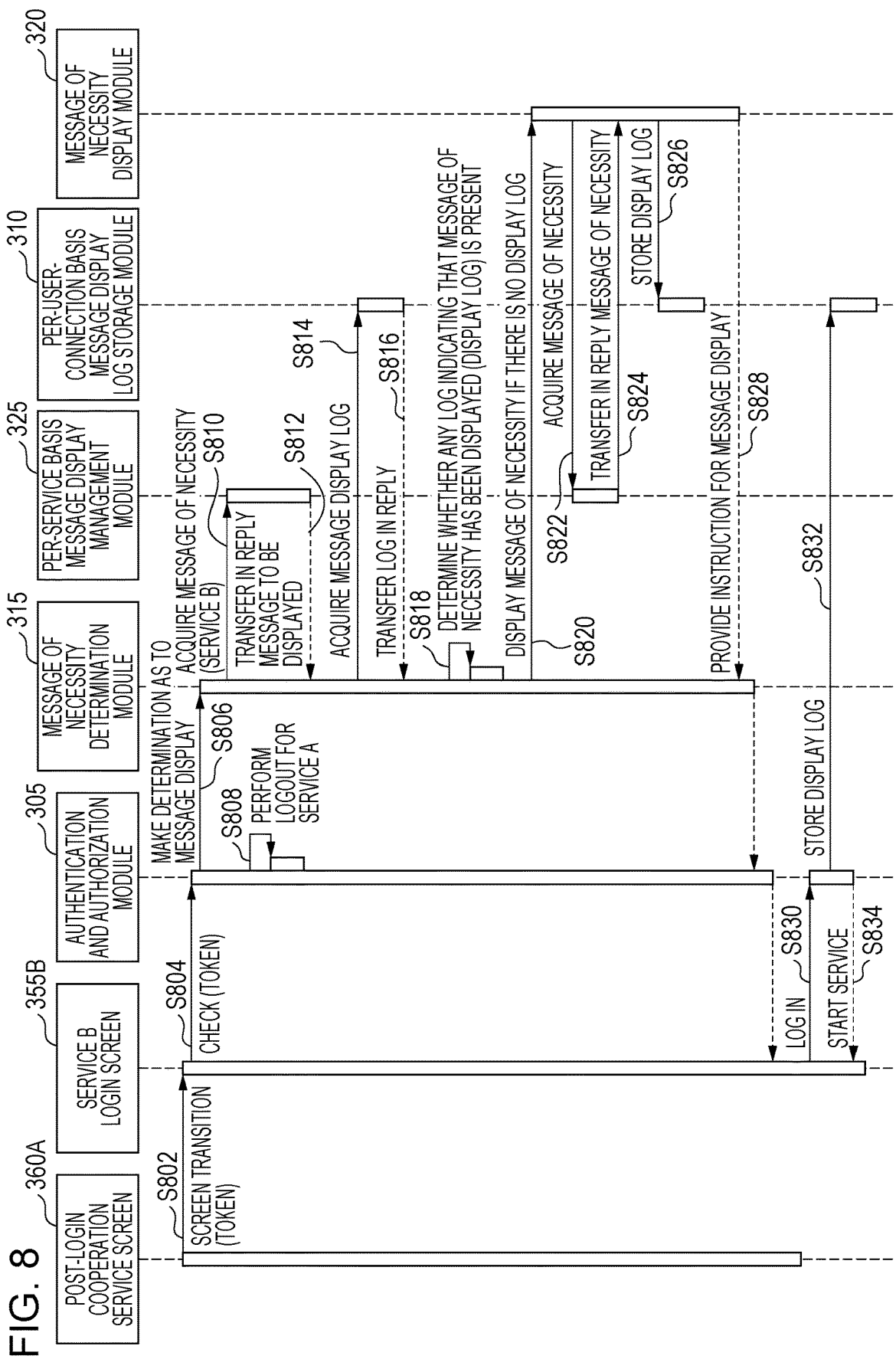
FIG. 8 is a flowchart illustrating a process example of the exemplary embodiment.

FIG. 8 is a flowchart illustrating a process example of the exemplary embodiment. To transition from the service A to the service B, the service A is logged out and an explicit login operation is performed on the service B. The flowchart in FIG. 8 is different from the flowchart in FIG. 7 in that the flowchart in FIG. 8 additionally includes operations in steps S808 and S830 through S834.

In step S802, the screen transitions from the post-login cooperative service A screen 360A to a service B login screen 355B. Specifically, the screen transitions from the service A to the service B in response to user operation. To transition to the service B as will be described with reference to step S808, the service A is to be logged out.

In step S804, the information processing apparatus 300 requests the authentication and authorization module 305 to check a token by using the service B login screen 355B.

In step S806, the authentication and authorization module 305 requests the message of necessity determination module 315 to perform determination as to message displaying.

In step S808, the authentication and authorization module 305 logs out of the service A. Specifically, the session is ended and the user is to perform the login operation on the service B. The login screen of the service B is thus displayed. In the flowchart in FIG. 8, however, the data on the login log memory module 122 is not deleted even after the end of the session.

In step S808, a) an automatic logout operation may be performed or b) an indication that the logout from the service A and the login to the service B are to be performed may be displayed such that the user is requested to provide an instruction to log out.

In step S810, the message of necessity determination module 315 transfers to the per-service basis message display management module 325 a command to acquire a message of necessity on the service B.

In step S812, the per-service basis message display management module 325 transfers in reply to the message of necessity determination module 315 a message that is to be displayed. Specifically, in accordance with the service to agreement term association table 400, the per-service basis message display management module 325 extracts the message that is to be notified on the service B.

In step S814, the message of necessity determination module 315 transfers to the per-user-connection basis message display log storage module 310 a command to acquire a message display log.

In step S816, the per-user-connection basis message display log storage module 310 transfers in reply the log to the message of necessity determination module 315. Specifically, the per-user-connection basis message display log storage module 310 transfers in reply the message displayed in the past by using the log table 500.

In step S818, the message of necessity determination module 315 determines whether the log indicating that the message of necessity has been displayed is present. Specifically, the message of necessity determination module 315 determines whether the message received in step S812 is found in the message received in step S816. If the message is a previously notified message, that message is still a target of notification as long as a time period X serving as a threshold has elapsed since the date of the notification. In this way, the message of necessity determination module 315 may determine that the message received in step S812 is not found in the message received in step S816. The message displayed on the service A is a target of notification if the time period X has elapsed since the date of the notification. The message displayed on the service A is displayed in a display form different from the display form of a message that is newly displayed on the service B. For example, the message to be newly displayed on the service B may be larger in size and the message displayed on the service A may be smaller in size.

In step S820, the message of necessity determination module 315 transfers to the message of necessity display module 320 a command to display a message of necessity if there is no display log. No display log means that the message received in step S812 is not found in the message received in step S816. If the message received in step S812 is found in the message received in step S816, operations in steps S820 through S828 are not performed. This is because the message to be displayed on the service B has been displayed on the service A.

In step S822, the message of necessity display module 320 transfers to the per-service basis message display management module 325 a command to acquire a message of necessity.

In step S824, the per-service basis message display management module 325 transfers in reply the message of necessity to the message of necessity display module 320.

In step S826, the message of necessity display module 320 stores a display log on the per-user-connection basis message display log storage module 310. Specifically, the message of necessity display module 320 adds the message to be displayed in step S828 to the log table 500 and stores the resulting log table 500 on the per-user-connection basis message display log storage module 310.

In step S828, the message of necessity display module 320 instructs the message of necessity determination module 315, the authentication and authorization module 305, and the service B login screen 355B to display the message. If there is no message of necessity in step S828, the instruction to display the message is not performed.

In step S830, the user performs the login operation on the authentication and authorization module 305 by using the service B login screen 355B.

In step S832, the authentication and authorization module 305 stores the display log on the per-user-connection basis message display log storage module 310.

In step S834, the authentication and authorization module 305 notifies the service B login screen 355B that the service B is enabled to start.

Subsequent to step S808, a standard login operation of the service B (specifically, operations in steps S602 through S608 in the flowchart in FIG. 6) may be performed instead of performing step S810 and thereafter. In that case, the message of the agreement term on the service B is thus displayed. If the message of the agreement term displayed on the service A is found in the agreement term on the service B, the same message is displayed again at the login of the service B.

Figure 9:
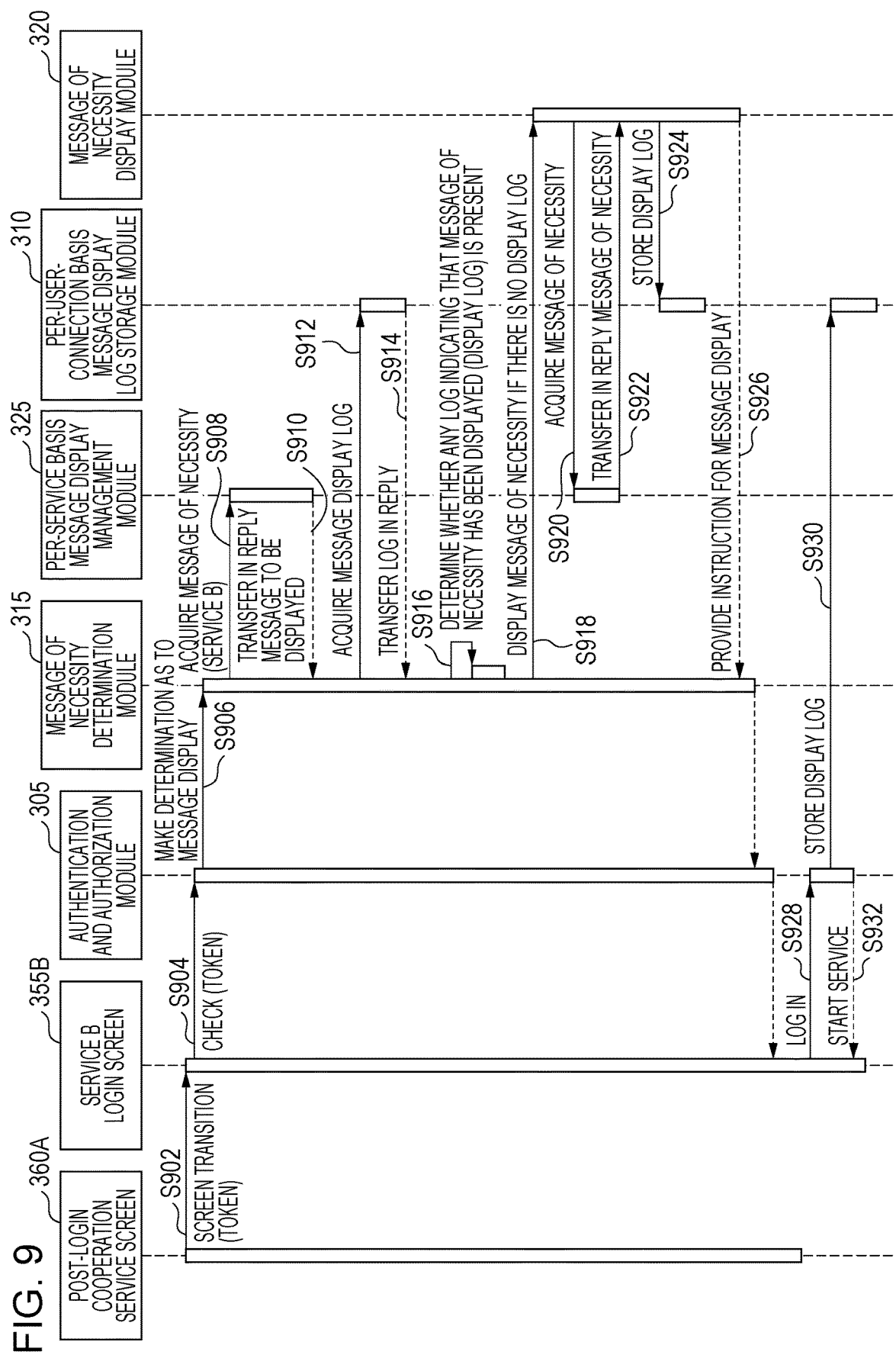
FIG. 9 is a flowchart illustrating a process example of the exemplary embodiment.

FIG. 9 is a flowchart illustrating a process example of the exemplary embodiment. The flowchart in FIG. 9 results from deleting the operation in step S808 in the flowchart in FIG. 8. Specifically, although the service B may be logged in by using the authentication information on the service A (in other words, the cooperative login operation is enabled), the login operation on the service B is to be performed to transition from the service A to the service B. The message of the agreement term may be displayed during the login of the service B. In the flowchart in FIG. 9, the data on the login log memory module 122 is deleted subsequent to the end of the session. This is because the service A is not logged out to transition from the service A to the service B.

In step S902, the screen is transitioned from the post-login cooperative service A screen 360A to the service B login screen 355B by using a token. Specifically, the screen is transitioned from the service A to the service B in response to user operation.

In step S904, the information processing apparatus 300 requests the authentication and authorization module 305 to check the token by using the service B login screen 355B.

In step S906, the authentication and authorization module 305 requests the message of necessity determination module 315 to perform a determination as to message displaying.

In step S908, the message of necessity determination module 315 transfers to the per-service basis message display management module 325 a command to acquire a message of necessity on the service B.

In step S910, the per-service basis message display management module 325 transfers in reply to the message of necessity determination module 315 a message that is to be displayed. Specifically, the per-service basis message display management module 325 extracts the message to be notified on the service B from the service to agreement term association table 400.

In step S912, the message of necessity determination module 315 transfers to the per-user-connection basis message display log storage module 310 a command to acquire a message display log.

In step S914, the per-user-connection basis message display log storage module 310 transfers in reply the log to the message of necessity determination module 315. Specifically, the per-user-connection basis message display log storage module 310 transfers in reply the message displayed in the past in accordance with the log table 500.

In step S916, the message of necessity determination module 315 determines whether the log indicating that the message of necessity has been displayed is present. Specifically, the message of necessity determination module 315 determines whether the message received in step S910 is found in the message received in step S914. If the message is a previously notified message, that message is still a target of notification as long as a time period X serving as a threshold has elapsed since the date of the notification. In this way, the message of necessity determination module 315 may determine that the message received in step S910 is not found in the message received in step S914. The message displayed on the service A is a target of notification if the time period X has elapsed since the date of the notification. The message displayed on the service A is displayed in a display form different from the display form of a message that is newly displayed on the service B. For example, the message to be newly displayed on the service B may be larger in size and the message displayed on the service A may be smaller in size.

In step S918, the message of necessity determination module 315 transfers to the message of necessity display module 320 a command to display the message of necessity if there is no display log. No display log means that the message received in step S910 is not found in the message received in step S914. If the message received in step S910 is found in the message received in step S914, operations in steps S918 through S926 are not performed. This is because the message to be displayed on the service B has been displayed on the service A.

In step S920, the message of necessity display module 320 transfers to the per-service basis message display management module 325 a command to acquire the message of necessity.

In step S922, the per-service basis message display management module 325 transfers in reply the message of necessity to the message of necessity display module 320.

In step S924, the message of necessity display module 320 stores the display log on the per-user-connection basis message display log storage module 310. Specifically, the message of necessity display module 320 adds the message to be displayed in step S926 to the log table 500 and stores the resulting log table 500 on the per-user-connection basis message display log storage module 310.

In step S926, the message of necessity display module 320 instructs the message of necessity determination module 315, the authentication and authorization module 305, and the service B login screen 355B to display the message. If there is no message of necessity in step S926, the instruction to display the message is not performed.

In step S928, the user performs the login operation on the authentication and authorization module 305 by using the service B login screen 355B.

In step S930, the authentication and authorization module 305 stores the display log on the per-user-connection basis message display log storage module 310.

In step S932, the authentication and authorization module 305 notifies the service B login screen 355B that the service B is enabled to start.

Subsequent to step S906, the standard login operation of the service B (specifically, operations in steps S602 through S608 in the flowchart in FIG. 6) may be performed instead of performing step S908 and thereafter. In that case, the message of the agreement term on the service B is thus displayed. If the message of the agreement term displayed on the service A is found in the agreement term on the service B, the same message is displayed again at the login of the service B.

The program described above may be provided in a recorded form on a recording medium or via a communication medium. The program described above may be construed as a computer readable non-transitory recording medium storing the program.

The non-transitory computer readable medium recording the program refers to as a recording medium that is used to install, execute, and/or distribute the program.

The recording media include digital versatile disk (DVD), compact disk (CD), Blu-ray disc (registered trademark), magnetooptical disk (MO), flexible disk (FD), magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with the standard formulated by the DVD forum, and "DVD+R and DVD+RW" complying with DVD+RW standards. The CDs include read-only CD (CD-ROM), recordable CD-R, and rewritable CD-RW.

The program in whole or in part may be stored on the recording medium for storage and distribution. The program in whole or in part may be transmitted via a transmission medium. The transmission media include a wired network, a wireless network, or a combination thereof. The wired and wireless networks may include a local-area network (LAN), metropolitan-area network (MAN), wide-area network (WAN), the Internet, intranet, and/or extranet. The program in whole or in part may be transmitted over a carrier wave.

The program may be part or whole of another program, or may be stored on the recording medium together with another program. The program may be split and the split programs may then be separately stored on the recording media. The program may be processed in any fashion before being stored as long as the program remains restorable. For example, the program may be compressed or encrypted before storage.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a memory storing a log of an agreement term notified on each login of a user and an agreement term on each service; and
   at least one processor configured to,
      when in a notification of the agreement terms to the user who is to use services, in a case where, after a login on a first service, a second service different from the first service is logged in without a login operation of the user by using authentication information on the first service in order to transition from the first service to the second service,
      compare an agreement term on the second service to an agreement term notified on the first service to determine whether the agreement terms are identical,
      not notify the agreement term on the second service to the user if the agreement term on the second service is determined to be identical in the log to the agreement term notified on the first service, and
      notify the agreement term on the second service to the user if the agreement term on the second service is determined to be different in the log from the agreement term notified on the first service, wherein the agreement terms are determined to be different if a content is different between the agreement terms.

2. The information processing apparatus according to claim 1, wherein the processor is configured to delete the log on the memory when a session of using the first service and/or the second service ends.

3. The information processing apparatus according to claim 1, wherein the processor is configured to notify the agreement term on the second service to the user as long as a predetermined time period has elapsed between a notification of the agreement term on the first service and the transition to the second service and even if the agreement term on the second service is identical to the agreement term notified on the first service.

4. The information processing apparatus according to claim 3, wherein the processor is configured to, when the agreement term notified on the first service is to be notified, notify the agreement term notified on the first service to the user in a notification form different from a notification form of the notification term notified on the second service.

5. An information processing apparatus comprising:
   a memory storing a log of an agreement term notified on each login of a user and an agreement term on each service; and
   at least one processor configured to,
      when in a notification of the agreement terms to the user who is to use services, in a case where, after a login on a first service, a second service different from the first service is enabled to be logged in without a login operation of the user by using authentication information on the first service in order to transition from the first service to the second service,
      log out of the first service,
      compare an agreement term on the second service to an agreement term notified on the first service to determine whether the agreement terms are identical, and
      when logging in the second service,
         not notify the agreement term on the second service to the user if the agreement term on the second service is determined to be identical in the log to the agreement term notified on the first service, and
         notify the agreement term on the second service to the user if the agreement term on the second service is determined to be different in the log from the agreement term notified on the first service, wherein the agreement terms are determined to be different if a content is different between the agreement terms.

6. A non-transitory computer readable medium storing a program causing a computer including a memory and at least one processor to execute a process for processing information, the memory storing a log of an agreement term notified on each login of a user and an agreement term on each service, the process comprising:

when in a notification of the agreement terms to the user who is to use services, in a case where, after a login on a first service, a second service different from the first service is logged in without a login operation of the user by using authentication information on the first service in order to transition from the first service to the second service, comparing an agreement term on the second service to an agreement term notified on the first service to determine whether the agreement terms are identical, not notifying the agreement term on the second service to the user if the agreement term on the second service is determined to be identical in the log to the agreement term notified on the first service, and notifying the agreement term on the second service to the user if the agreement term on the second service is determined to be different in the log from the agreement term notified on the first service, wherein the agreement terms are determined to be different if a content is different between the agreement terms.

\* \* \* \* \*